(12) United States Patent
Kato

(10) Patent No.: US 7,054,032 B2
(45) Date of Patent: May 30, 2006

(54) IMAGE PROCESSING APPARATUS AND METHOD

(75) Inventor: Shinichi Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 862 days.

(21) Appl. No.: 09/945,801

(22) Filed: Sep. 5, 2001

(65) Prior Publication Data

US 2002/0031257 A1    Mar. 14, 2002

(30) Foreign Application Priority Data

Sep. 12, 2000  (JP)  ............................. 2000-277206

(51) Int. Cl.
*G06K 9/00*  (2006.01)

(52) U.S. Cl. ...................... 358/1.9; 358/2.1; 358/3.23; 358/521; 382/162

(58) Field of Classification Search ................. 358/1.9, 358/2.1, 3.23, 3.27, 518, 521, 453, 462; 382/162, 382/167, 173, 176, 260, 263, 264, 266
See application file for complete search history.

(56) References Cited

U.S. PATENT DOCUMENTS

| 5,341,227 A | * | 8/1994 | Kumashiro | ................. 358/533 |
| 5,809,216 A | * | 9/1998 | Ng | .............................. 358/1.9 |
| 5,999,279 A | * | 12/1999 | Kouzaki et al. | ............. 358/520 |

* cited by examiner

*Primary Examiner*—Thomas D. Lee
(74) *Attorney, Agent, or Firm*—Fitzpatrick, Cella, Harper & Scinto

(57) ABSTRACT

To provide an image processing apparatus capable of making an MTF correction for each image at a low cost. The image processing apparatus according to the present invention performs a spatial filtering process by selecting a filter having an appropriate spatial frequency characteristic for each area according to an image area determination signal and a color gamut determination signal for an input color image signal. Furthermore, an image signal is divided into blocks for each image area, and an appropriate spatial filter is selected for each block depending on the ratio of blocks of each image area to the entire block. Thus, an appropriate filter can be selected depending on the characteristic of an image, and an appropriate MTF correction can be made without largely changing a conventional configuration.

29 Claims, 15 Drawing Sheets

FIG. 3B
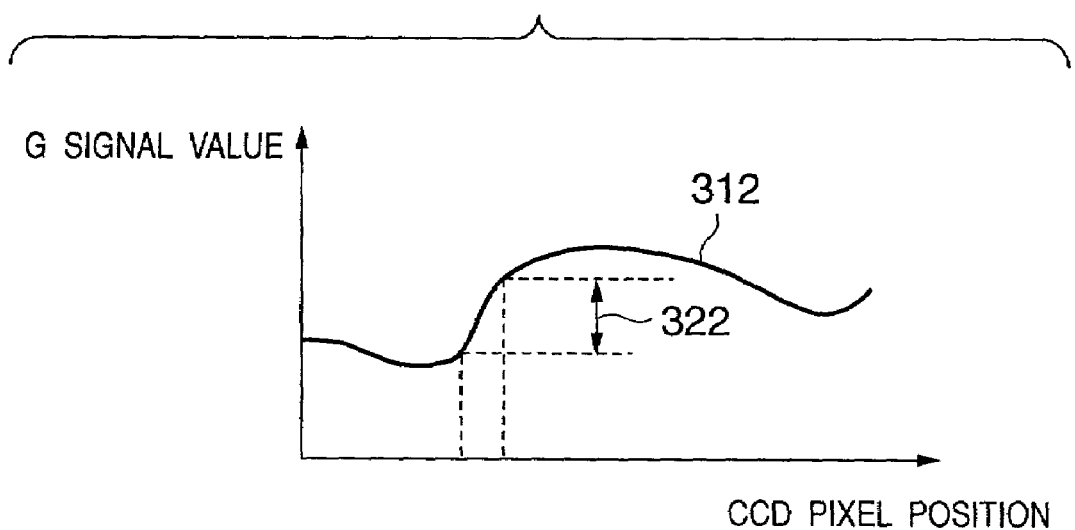
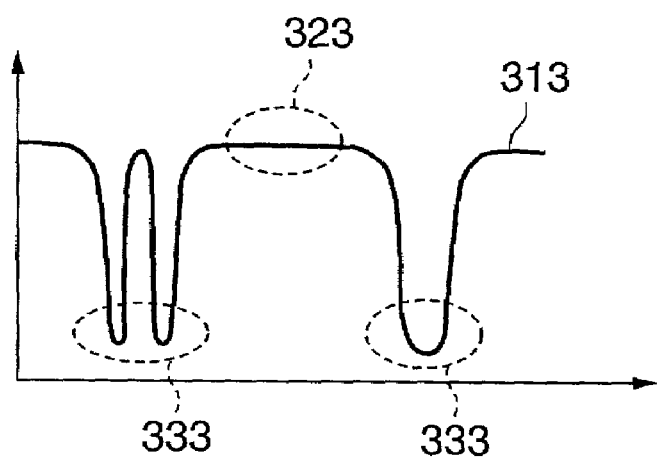

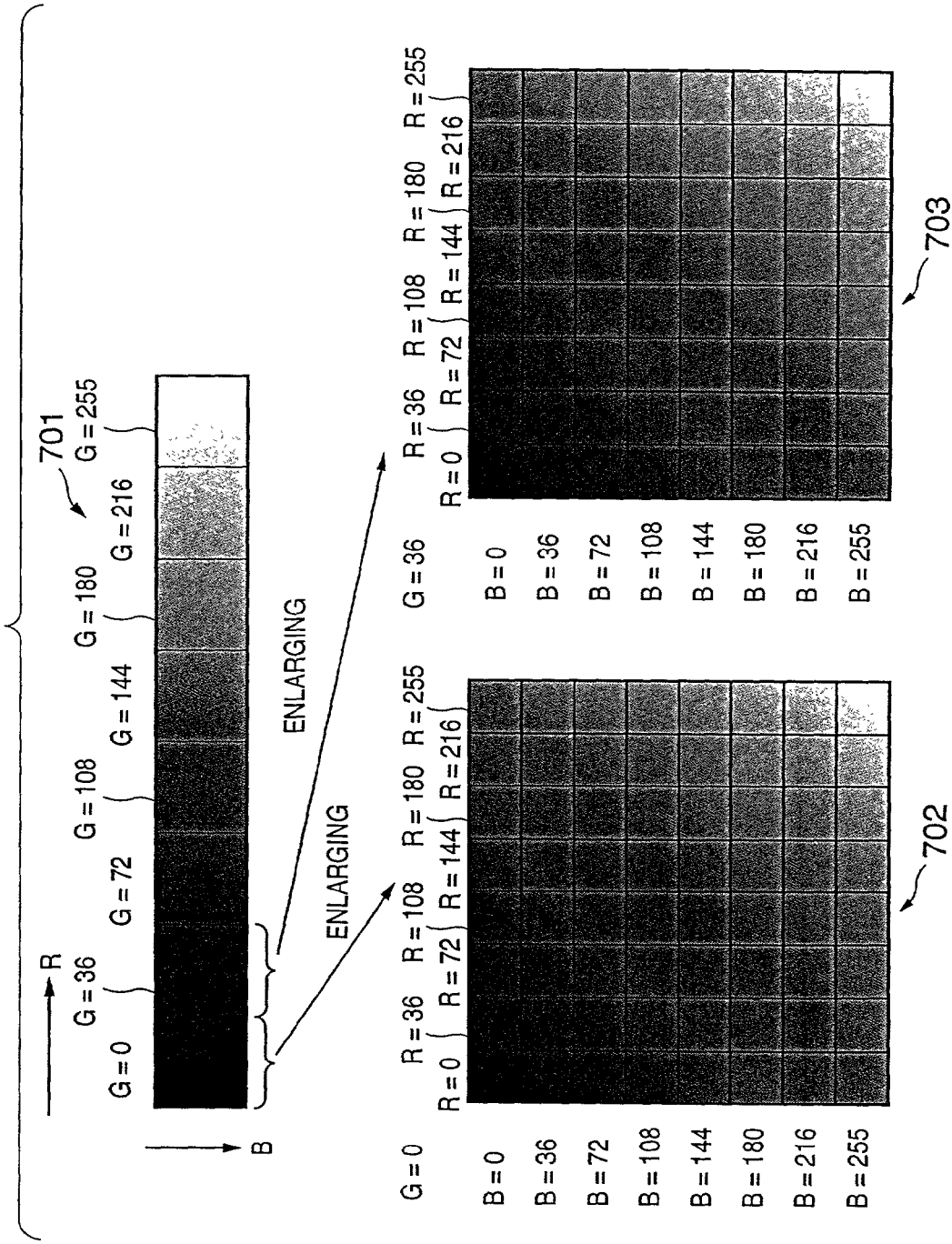

500 (UNIT CUBE NUMBER 2)

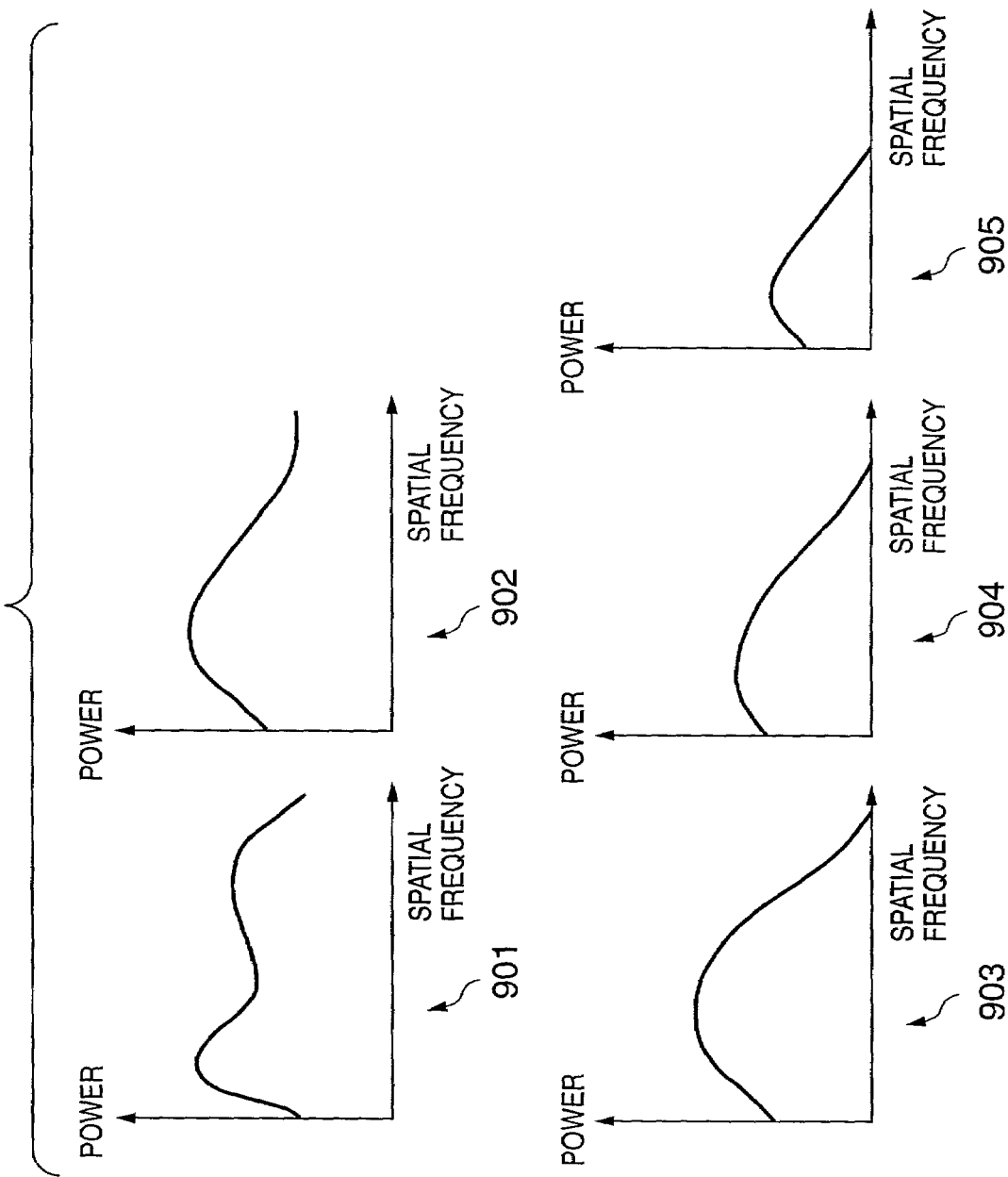

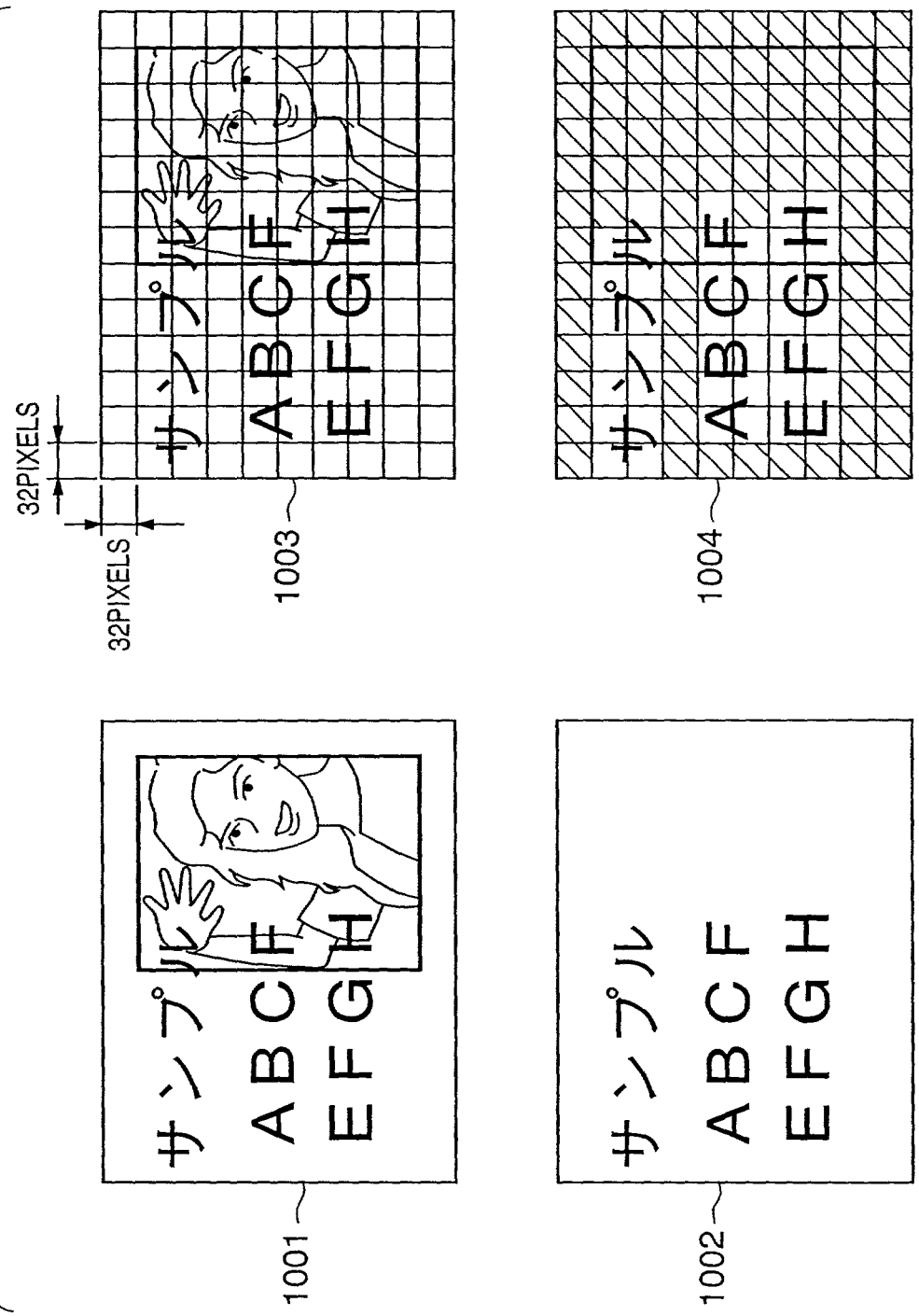

IMAGE PROCESSING APPARATUS AND METHOD

FIELD OF THE INVENTION

The present invention relates to an image processing apparatus for correcting an MTF for image data and a method therefor.

BACKGROUND OF THE INVENTION

Conventionally, an image processing apparatus such as a digital color copying machine, etc. aims at obtaining an output image faithful to an original image.

Therefore, a digital color copying machine performs each image processing in an image signal processing unit on digital input image data of an original image read by a scanner unit, visualizes the image-processed digital image data in a printer unit, and obtains a copied output closest possible to the original image.

In the image processing in the above mentioned image signal processing unit, the image data of red (R), green (G), and blue (B) read from the original image is converted into cyan (C), magenta (M), yellow (Y), and black (K) for color reproduction, and the printer unit forms an image on a recording paper based on the CMYK data.

A coefficient of each image processing in the image signal processing unit is set to an ideal value for appropriate reproduction of an original image read by a scanner unit into copied output by the printer unit.

However, an image is more or less deteriorated by image noise caused by the reading precision of the scanner unit, the color reproducibility of the printer unit, various factors in a data processing system, etc., thereby requiring means for correcting the image.

Especially, when a full-color image is reproduced, the unevenness in a even gray scale portion can be detected. Therefore, it is necessary to consider the smoothness as well as the resolution. However, if the resolution is emphasized, the even gray scale portion appears uneven, and the image looks unnatural. On the other hand, of the smoothness is emphasized, an edge portion and a character portion become blur, thereby reducing the resolution.

Therefore, the conventional color copying machine maintains the consistency between the resolution and the smoothness of an image in the following method.

First, image data in three colors R, G, and B obtained by reading an original image is checked on the edge/character portion and the even gray scale portion based on predetermined reference values by detecting an edge amount, determining the thickness of a fine line, etc. Then, an MTF (modulation transfer function) correction (spatial frequency correction) unit performs a predetermined edge emphasizing process on the image data of the edge/character portion, and performs a predetermined smoothing process on the image data of the even gray scale portion indicating a small change in gray scale to reproduce an image more clearly on the edge/character portion and more smoothly on the even gray scale portion. Thus, the deterioration of a reproduced image can be reduced while maintaining both resolution and smoothness.

However, in the above mentioned conventional color copying machine, it is desired that, for example, the level of the smoothing process can be varied depending on the type and pattern of image data to be processed in addition to switching between the above mentioned edge emphasizing process and the smoothing process with the development of high technology in function and image quality.

For example, in a photograph of a baby or a small child, it is desired that the image of his or her skin is to be more smoothly reproduced than other portions in the photograph. It is also desired that a photograph of woods is to be reproduced with the entire image smoothly, but with each leaf appearing clearly.

Therefore, to satisfy all these needs, it is suggested that a color copying machine is equipped with a determination circuit for recognizing the type or pattern of an image. In this case, however, there arises the problem that the circuit is costly, the determination computing process lowers the copying speed, etc.

SUMMARY OF THE INVENTION

The present invention has been proposed to solve the conventional problems, and has as its object to provide an image processing apparatus capable of correcting the MTF depending on the image at a lower cost.

According to the present invention, the foregoing object is attained by providing an image processing apparatus, comprising: image input means for inputting a color image signal; image area determination means for determining an area characteristic in the color image signal; conversion means for converting the color image signal input by said image input means into an output image signal by an interpolating operation using a table memory, wherein the table memory stores interpolation data in each address, and higher order bits of the color image signal are used to define an address of the table memory in which interpolation data is stored, and lower order bits of the color image signal are used in the interpolating operation; color gamut determination means for determining a color gamut characteristic in the output image signal based on the higher order bits of the color image signal; correction means for making an MTF correction to the output image signal based on determination results of said image area determination means and said color gamut determination means; and image output means for visualizing the output image signal to which the MTF correction is made, or by providing an image processing apparatus, comprising: image input means for inputting color image signal; image area determination means for determining an area characteristic in the color image signal; conversion means for converting the color image signal input by said image input means into an output image signal by an interpolating operation using a table memory, wherein the table memory stores interpolation data in each address, and higher order bits of the color image signal are used to define an address of the table memory in which interpolation data is stored, and lower order bits of the color image signal are used in the interpolating operation; block division means for dividing the output image signal into blocks for each image area depending on a determination result by said image area determination means and based on the higher order bits of the color image signal; correction means for making an MTF correction to each block depending on a block ratio for each image area to an entire block of the output image signal; and image output means for visualizing the output image signal to which the MTF correction is made, or by providing an image processing apparatus, comprising: image input means for inputting a color image signal; image area determination means for determining an area characteristic in the color image signal; conversion means for converting the color image signal input by said image input means into an output image signal by an interpolating operation using a table memory, wherein the table memory stores interpolation data in each address, and higher order bits of the color image signal are used to define an address of the table memory in which interpolation data is stored, and lower order bits of the color image signal are used in the interpolation operation; color gamut determination means for determining a color gamut characteristic in the output image signal based on the higher order bits of the color image signal; correction means for making an image correction to the output image signal based on determination results of said image area determination means and said color gamut determination means; and image output means for visualizing the output image signal to which the image correction is made.

In accordance with the present invention as described above, the image processing apparatus for making the optimum MTF correction depending on the type and pattern of image data can be realized at a low cost.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3B shows an example of the read characteristic in the photograph area and the character area;

FIG. 7A shows an example of LUT data for computation;

FIG. 9 shows an example of a spatial filter according to the embodiment of the present invention; and FIG. 10 shows the filter setting process depending on an area attribute according to a second embodiment of the present invention.

DETAILED DESCRIPTION OF THE PREFERRED EMBODIMENTS

Preferred embodiments of the present invention will now be described in detail in accordance with the accompanying drawings.

First Embodiment

[Overview of Apparatus]

Figure 1:
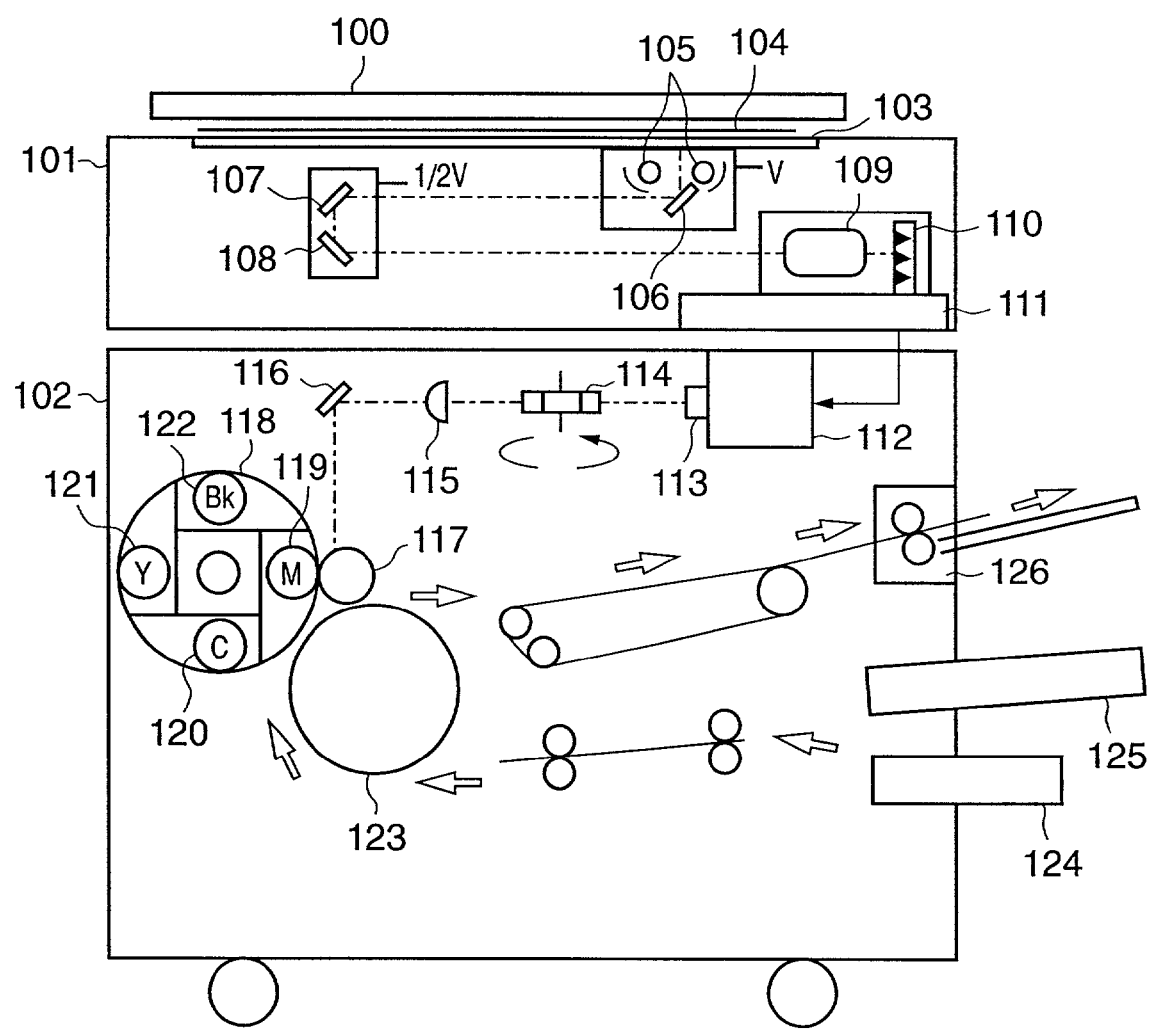
FIG. 1 is a side sectional view of the color copying machine according to an embodiment of the present invention.

FIG. 1 is a side sectional view of a digital color copying machine to which the present embodiment is applied.

The color copying machine shown in FIG. 1 mainly comprises an image reader unit 101 for reading an original image, and a printer unit 102 for reproducing the image data read by the image reader unit 101. The image reader unit 101 reads the original image at the resolution of 400 dpi (dots/inch) and performs a digital signal process. The printer unit 102 printouts the image corresponding to the original image read by the image reader unit 101 as a full-color image on the recording paper at the resolution of 400 dpi.

The outline of the operation performed by the color copying machine according to the present embodiment is described below by referring to FIG. 1.

In the image reader unit 101, reference numeral 100 denotes a mirror surface pressure plate, an original image 104 on an original image plate glass (hereinafter referred to as a platen) 103 is lighted by a lamp 105, and the reflected rays are led to mirrors 106, 107, and 108, and collected by a lens 109. Reference numeral 110 denotes a 3-line sensor (hereinafter referred to as a CCD) 110 for converting an input light into an electric signal. The rays collected by the lens 109 form an image on the CCD 110, and the full-color information indicating an original image is transmitted as the elements of red (R), green (G), and blue (B) to a signal processing unit 111.

When the carriage fixing the lamp 105 and the mirror 106, and the mirrors 107 and 108 are moved mechanically and vertically to the electric scanning direction (horizontal scanning direction) of the CCD 110 at the respective speeds of v and ½v, the entire original image can be scanned (vertically scanned).

Reference numeral 111 denotes a signal processing unit for electrically processing an image signal of RGB output by the CCD 110, analyzing the image into elements of magenta (M), cyan (C), yellow (Y), and black (Bk), and transmitting the result to the printer unit 102.

In each scanning process on the original image in the image reader unit 101, one of the elements M, C, Y, and Bk is transmitted to the printer unit 102, and a total of four scanning processes on the original image completes one printout process.

In the printer unit 102, each image signal of the M, C, Y, and Bk transmitted from the image reader unit 101 is first input to a laser driver 112. The laser driver 112 modulation-drives a semiconductor laser 113 according to the received image signal. The oscillated laser beam scans a photosensitive drum 117 through a polygon mirror 114, an f-θ lens 115, and a mirror 116, and forms a virtual image on the photosensitive drum 117.

A reference numeral 118 denotes a rotating developer comprising a magenta developer 119, a cyan developer 120, an yellow developer 121, and a black developer 122. These four developers alternately touch the photosensitive drum 117 to develop the virtual image formed on the photosensitive drum 117 with the toner of each color. Reference numeral 123 denotes a transfer drum with recording paper provided by paper cassette 124 or 125 rolled on it, and it transfers the toner image developed on the photosensitive drum 117 to the recording paper. Thus, after sequentially transferring the four colors of M, C, Y, and Bk on one sheet of recording paper, the recording paper is exhausted out of the machine after the toner image is fixed by a fixing unit 126.

Described below in detail is the configuration of each unit of the color copying machine according to the present embodiment.

[Image Reader Unit 101]

Described below in detail is the image reader unit 101. To clarify the difference from the leader unit of the conventional copying machine, FIG. 2A shows the configuration of the conventional image reader unit, and FIG. 2B shows the configuration of the image reader unit 101 according to the present embodiment.

Figure 2A:
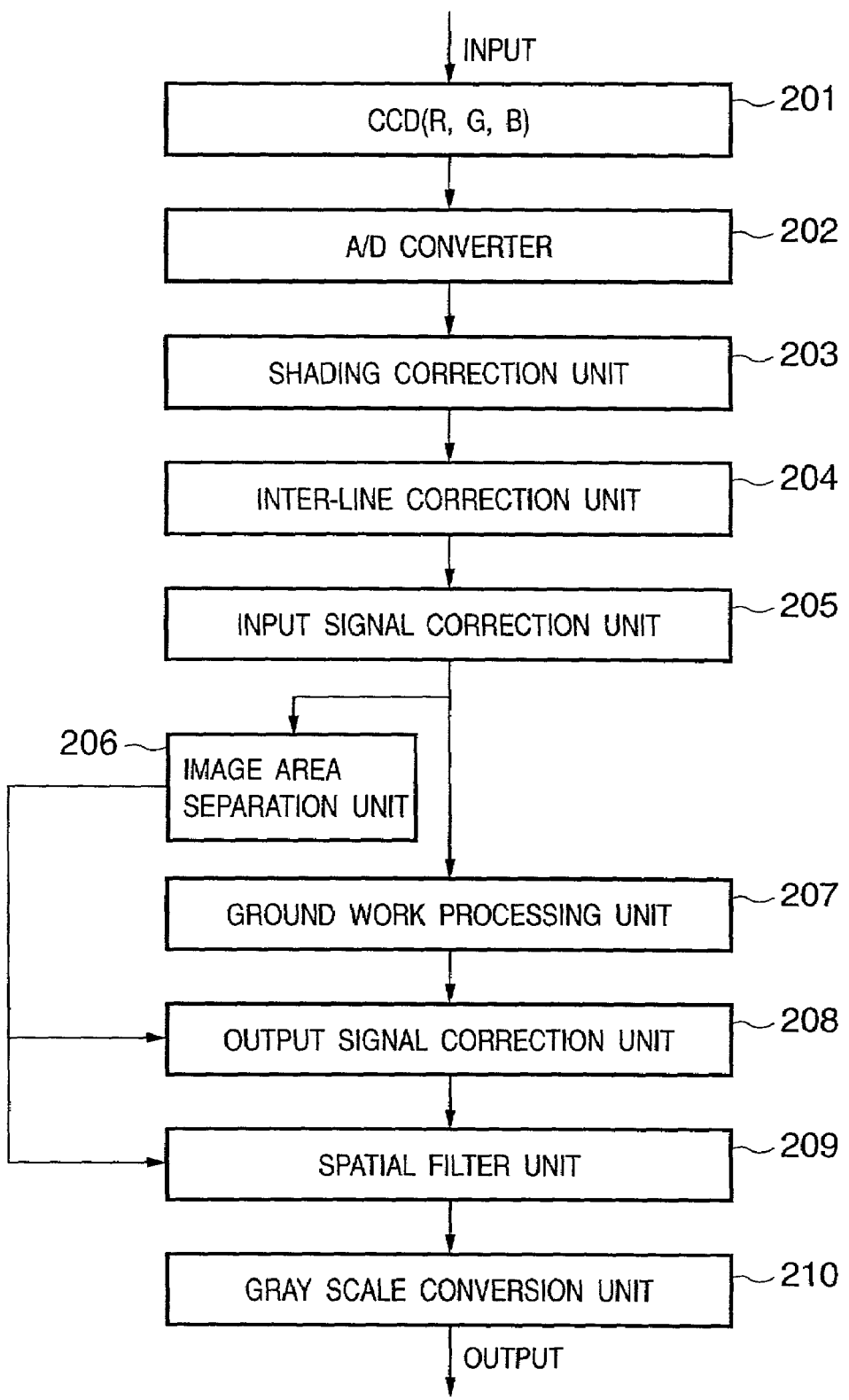
FIG. 2A shows the configuration of the conventional image reader unit.
Figure 2B:
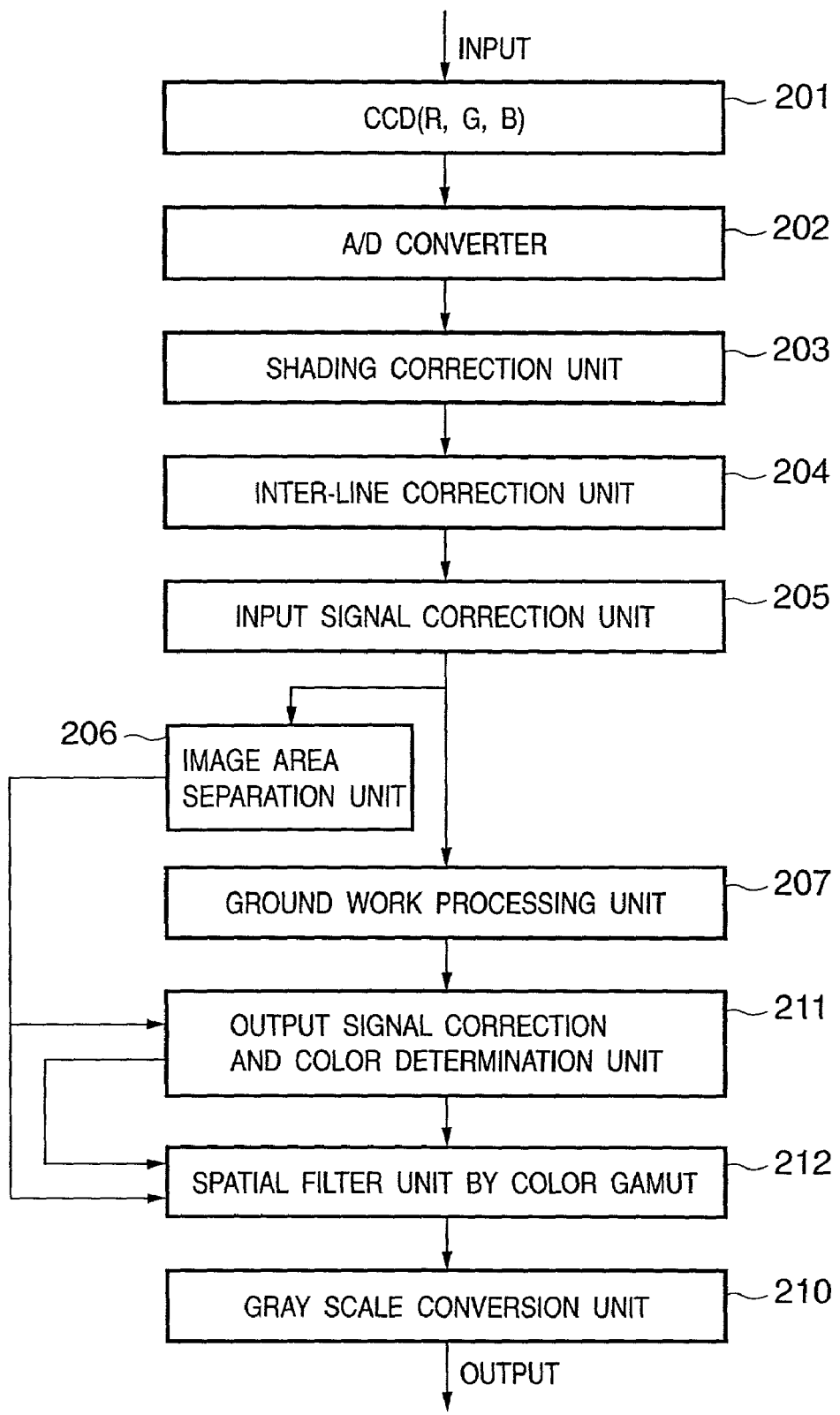
FIG. 2B shows the configuration of an image reader unit 101 according to the embodiment of the present invention.

First, the configuration common in FIGS. 2A and 2B is described. Reference numeral 201 denotes a CCD (solid-state image pickup device) sensor having a spectral sensitivity characteristic of red (R), green (G), and blue (B), corresponding to the 3-line sensor 110 shown in FIG. 1. The analog image data read by the CCD sensor 201 is input to an A/D converter 202. The A/D converter 202 converts each of the input signals into an 8-bit output (0 to 255) digital signal for output.

A digital signal output from the A/D converter 202 is input to a shading correction unit 203. The shading correction unit 203 corrects the unevenness of the read data caused by the uneven lighting by the lamp 105 shown in FIG. 1.

An inter-line correction unit 204 performs an inter-line data interpolating process on the digital data corrected by the shading correction unit 203 to correct the shift among the reading timings among R, G, and B caused by the arrangement of the three-line CCD in the CCD sensor 201 for reading RGB image data at predetermined physical distances.

The digital signal output from the inter-line correction unit 204 is input into an input signal correction unit 205, and performs a predetermined masking operating process to compensate the unnecessary transmission characteristic which is not an ideal spectral characteristic of the color separation filter of the CCD sensor 201 for each read pixel.

An image area separation unit 206 determines each image area in input image data as to whether the area is an edge/character portion or a natural image portion (even gray scale portion), and transmits a determination signal to each processing unit described later.

Described below is an example of an image area determining method in the image area separation unit 206.

Figure 3A:
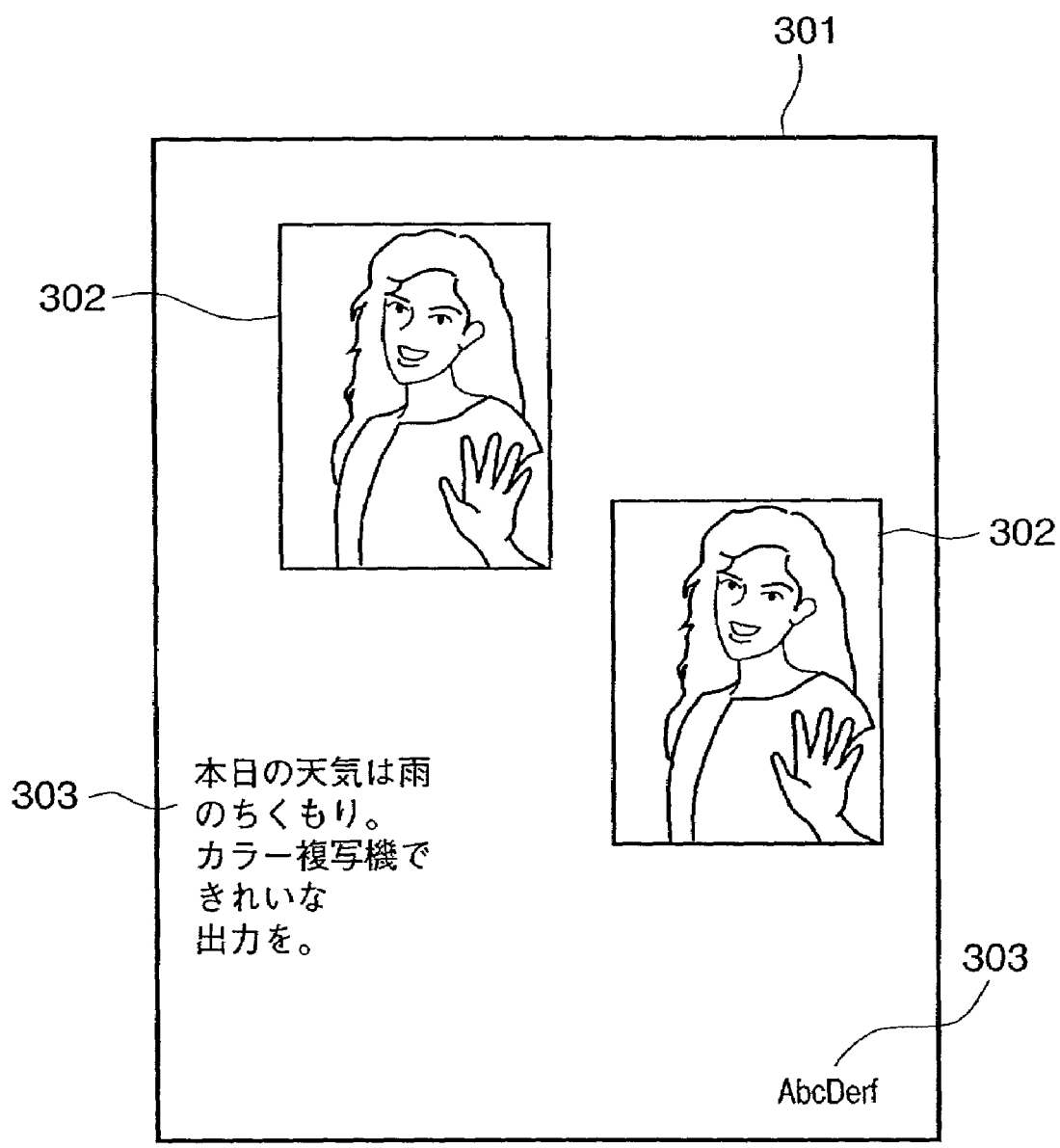
FIG. 3A shows an example of an original image containing both a photograph area and a character area.

FIGS. 3A and 3B show an example of a determining method in the image area separation unit 206. FIG. 3A shows an original image 301 containing both photograph area 302 and character area 303. The image reader unit 101 scans the original image 301 using the CCD sensor 201, and reads a color digital signal (R, G, B) for each pixel.

The read RGB signal has the attribute-dependence characteristic for each image area. In the signal values (R, G, B) read by the CCD sensor 201 in each area, a G signal is plotted in the CCD array direction, thereby obtaining, for example, a graph as shown in FIG. 3B. FIG. 3B shows two graphs indicating different image characteristics in which the horizontal axis indicates the pixel position in the CCD array direction while the vertical axis indicates the read signal value and a pixel closer to white (bright) at an upper portion on the vertical axis.

Curves 312 and 313 shown in FIG. 3B show examples of the characteristics appearing when the photograph area 302 and the character area 303 shown in FIG. 3A are read. As shown by the curve 312, the photograph area 302 shows a relatively moderate change depending on the position of a read image signal. Therefore, a difference 322 of a pixel value in the short distance has a relatively small value. On the other hand, as shown by the curve 313, the character area 303 normally contains black characters on the white ground. Therefore, the read image signal has the characteristic of suddenly changing around a white portion 323 through a character portion 333.

To determine the characteristic for each area, the above mentioned characteristic for each area can be detected from the read signal of an original image. To attain this, a well-known attribute determining method can be used based on a well-known characteristic extracting process on the change amount of image data around a target pixel, an accumulation value of change amounts in a certain interval, the intensity values of surrounding pixels (determination as to whether it is a white ground or a colored background), the number of times of changes of image data in a certain interval from white to black, etc.

In the image area separation unit 206, an area is determined in the above mentioned method, and an image area determination signal is output for each pixel.

Described below are FIGS. 2A and 2B. A ground work processing unit 207 sets the ground level of an original image such that the brightest color in the original image can be white for the digital signal of RGB output from the input signal correction unit 205. Then, the image reader unit 101 according to the present embodiment is different from the conventional image reader unit in the following units of the configuration.

First, in the conventional image reader unit shown in FIG. 2A, the RGB signal output from the ground work processing unit 207 is input into an output signal correction unit 208, and a CMYK signal is computed according to the RGB signal such that the original image matches in color the output copy from the printer unit 102. The arithmetic operation is based on the determination signal indicating the determination result from the image area separation unit 206, and different arithmetic operations are performed between the edge/character portion and the natural image portion. Each of the computed signals of cyan (C), magenta (M), yellow (Y), and black (Bk) is sequentially output with a predetermined bit length (for example, 8 bits) each time a reading operation is performed.

The CMYK signal output from the output signal correction unit 208 is input into a spatial filter unit 209, and an MTF correction is made to a spatial frequency. At this time, according to the determination signal from the image area separation unit 206, the edge emphasizing process and the smoothing process appropriate for the original image are performed. For example, the edge emphasizing process is performed on the edge/character portion, and the smoothing process is performed on the natural image portion.

On the other hand, in the image reader unit 101 according to the present embodiment shown in FIG. 2B, the RGB signal output from the ground work processing unit 207 is input into an output signal correction and color determination unit 211. Then, the CMYK signal is computed according to the RGB signal such that the original image can match in color the copy output from the printer unit 102. At this time, as with the output signal correction unit 208 in the conventional image reader unit, different arithmetic operations are performed between the edge/character portion and the natural image portion according to the determination signal from the image area separation unit 206. In the output signal correction and color determination unit 211, a color determination signal for determination of a specific color portion is computed based on the input RGB signal value, and is output to a spatial filter unit by color gamut 212.

An MTF correction is made to a spatial frequency in the spatial filter unit by color gamut 212. However, an edge emphasizing process and a smoothing process appropriate for the original image are performed according to the determination signal from the image area separation unit 206 and the color determination signal from the output signal correction and color determination unit 211. Practically, the smoothing process is performed on the specific color portion in a natural image, and the edge emphasizing process is performed on the other portions.

In FIGS. 2A and 2B, the CMYK signal output from the spatial filter unit 209 and the spatial filter unit by color gamut 212 shown in FIG. 2B is input into a gray scale conversion unit 210, and the gray scale characteristic of the printer unit 102 is corrected. The gray scale conversion unit 210 comprises a lookup table ROM or RAM not shown in the attached drawings.

[Output Signal Correction Unit 208]

To clarify the characteristic of the image reader unit 101 according to the present embodiment, the output signal correction unit 208 in the conventional image reader unit shown in FIG. 2A is described below in detail.

Figure 4:
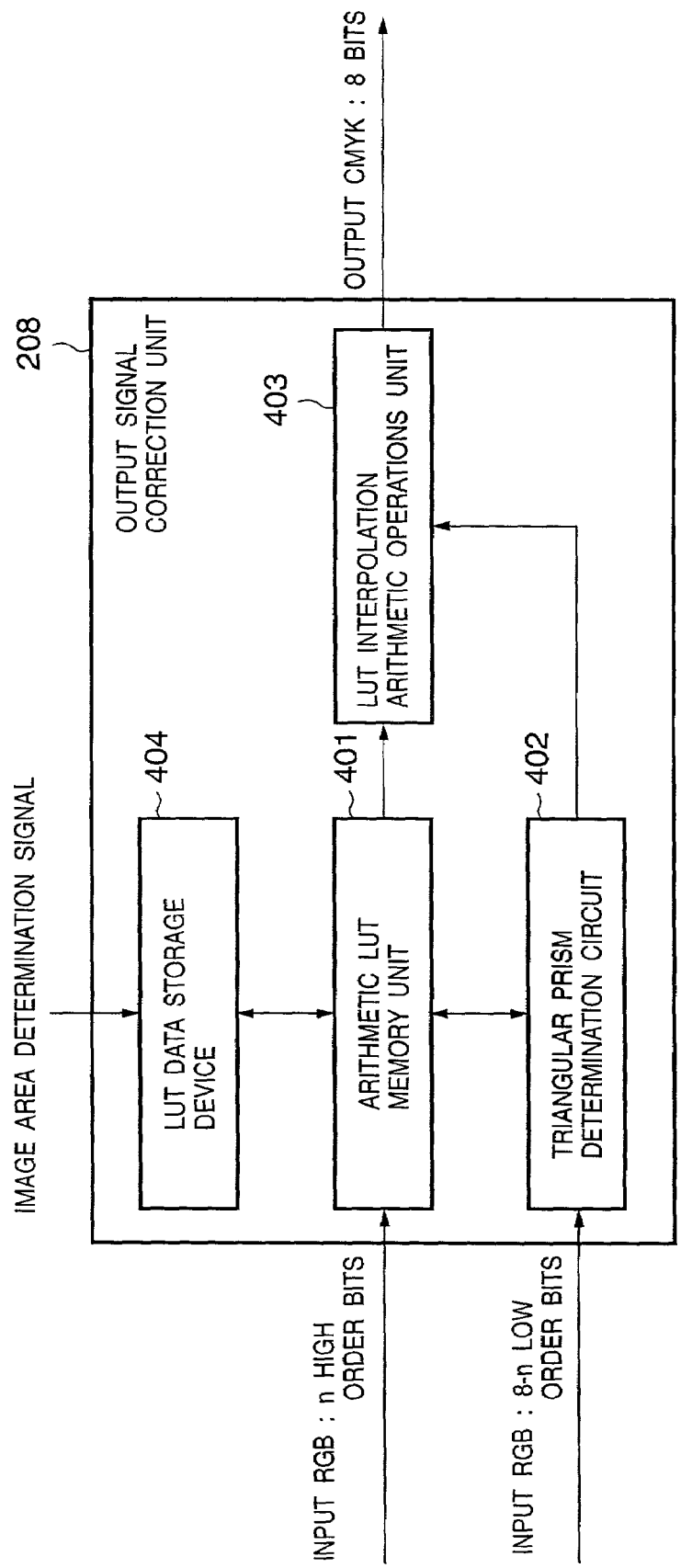
FIG. 4 is a block diagram of the detailed configuration of an output signal correction unit 208.

FIG. 4 shows the detailed configuration of the output signal correction unit 208. In the output signal correction unit 208, an input image signal value is converted into an output image signal value in an interpolating operation using the table memory. That is, 8 bits are assigned to each color of an input RGB signal, 8 bits are assigned to each color of an output CMYK signal, a higher order bit of an input signal is used as the address of the color correction table, and a lower order bit is used in an interpolating operation.

Described below in detail is an operation in the output signal correction unit 208.

In FIG. 4, reference numeral 401 denotes an arithmetic LUT memory unit for retaining an arithmetic look-up table (hereinafter referred to as an LUT), higher n bits of the input image signal value are input as the address, and addressing a unit cube in a color space shown in FIG. 5 described later is performed. Reference numeral 402 denotes a triangular prism determination circuit, which determines which triangular prism shown in FIG. 5 described later contains an interpolation point based on the remaining lower order bits (8-n bits) of the input image signal value. Reference numeral 403 denotes an LUT interpolation arithmetic operations unit for performing an LUT interpolating operation by an equation (1) described later based on an address in the arithmetic LUT memory unit 401 and a determination result in the triangular prism determination circuit 402.

Reference numeral 404 denotes an LUT data storage device storing plural pieces of grating point data containing LUT grating point data corresponding to the image area determination signal transmitted from the image area separation unit 206 of the arithmetic LUT memory unit 401. The LUT data storage device 404 selects an arithmetic LUT from among plural pieces of LUT grating point data for each area according to the image area determination signal, and rewrites the data in the arithmetic LUT memory unit 401 with the arithmetic LUT. Then, the LUT interpolation arithmetic operations unit 403 performs an arithmetic operation for each area.

Described below in detail is the interpolating operation performed by the output signal correction unit 208. FIG. 5 shows an example of an interpolating method according to the present embodiment. In FIG. 5, each of triangular prisms 501 to 506 shows an example of the dividing method of a unit cube 500 in an XYZ color space. That is, the unit cube 500 which is addressed by a higher bit, and is to be interpolated is divided into six pieces, that is, the triangular prisms 501 to 506, by the three planes of X=Y, Y=Z, and Z=X.

An example of an interpolating operation expression in the LUT interpolation arithmetic operations unit 403 is shown below using the triangular prism 501 as an example.

$$\text{Out }(X, Y, Z) = \text{Out }(Xh, Yh, Z) \times (1-Xl) + \text{Out }(Xh+1, Y, Z) \times (Xl-Yl) + \text{Out }(Xh+1, Yh+1, Z) \times (Yl-Zl) + \text{Out }(Xh+1, Yh+1, Zh+1) \times (Zl) \quad \text{equation (1)}$$

where Out (X, Y, Z) indicates an output value to the input (X, Y, Z), Xh, Yh, and Zh indicate higher bits, and X1, Y1, and Z1 indicate lower bits of the input.

Which triangular prism in the triangular prisms 501 to 506 in the unit cube 500 contains a point to be interpolated is determined by the collating sequence of the lower bits in the triangular prism determination circuit 402. The correspondence between the collating sequence of lower bits and the triangular prisms 501 to 506 is shown in FIG. 5. The LUT interpolation arithmetic operations unit 403 obtains an interpolation output value by performing an interpolating operation shown in the above mentioned equation (1) on the grating point value stored in the arithmetic LUT memory unit 401 as the four points of the target triangular prism.

[Output Signal Correction and Color Determination Unit 211]

Described below in detail is the configuration of the image reader unit 101 according to the present embodiment.

Figure 6:
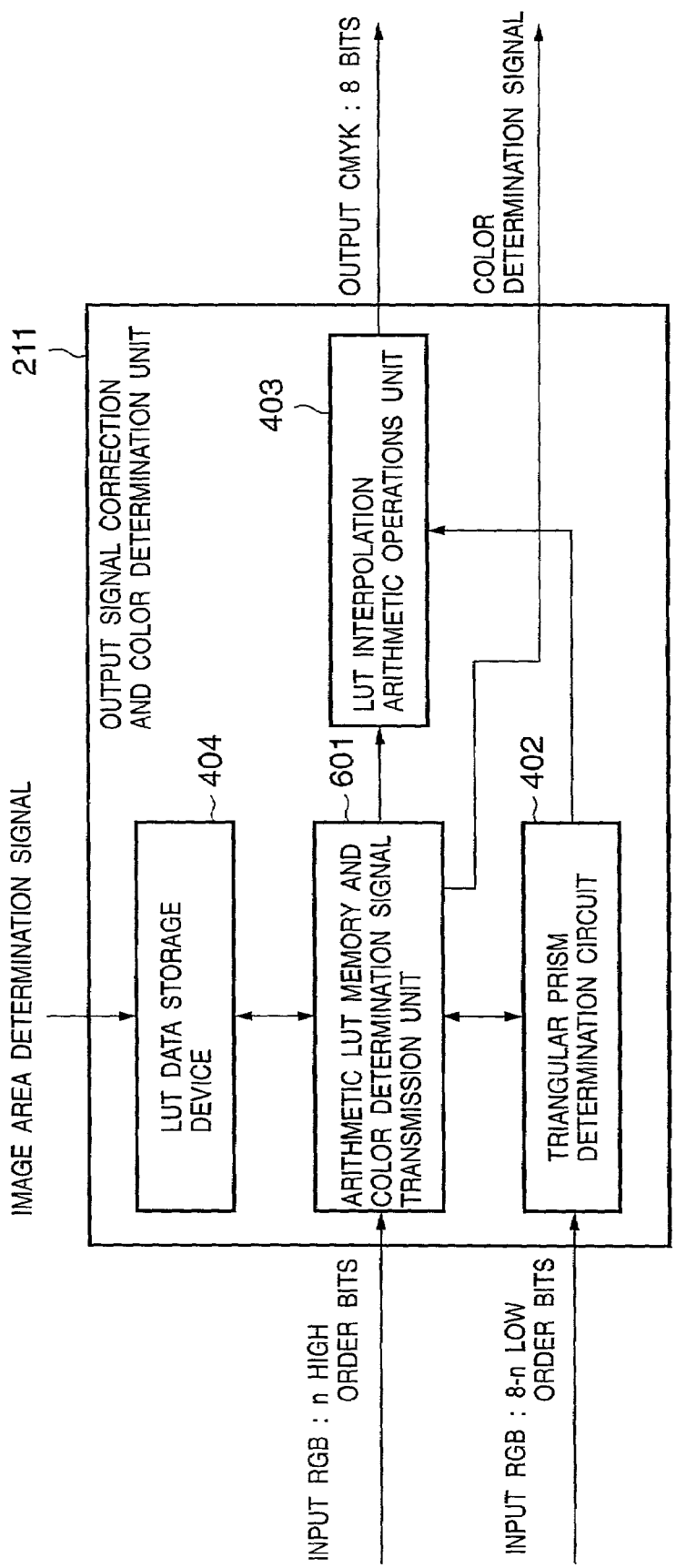
FIG. 6 is a block diagram of the detailed configuration of an output signal correction and color determination unit 211.

FIG. 6 shows the detailed configuration of the output signal correction and color determination unit 211 according to the present embodiment. In the output signal correction and color determination unit 211, as in the above mentioned conventional output signal correction unit 208, an input image signal value is converted into an output image signal value in an interpolating operation using the table memory. That is, 8 bits are assigned for each color of the input RGB signal, 8 bits are assigned to each color of the output CMYK signal, a higher order bit of an input signal is used as the address of the color correction table, and a lower order bit is used in an interpolating operation.

Described below in detail is an operation in the output signal correction and color determination unit 211.

In FIG. 6, reference numeral 601 denotes an arithmetic LUT memory and color determination signal transmission unit obtained by adding a color determination signal transmission unit to the arithmetic LUT memory unit 401 shown in FIG. 4. After inputting a higher n bits of an input image signal value as an address, the addressing value of the unit cube 500 in the color space shown in FIG. 5 is transmitted to the processing unit at the subsequent stage as a color determination signal. Since the other configurations shown in FIG. 6 are the same as those shown in FIG. 4, the detailed explanation is omitted here.

Described below in detail is the arithmetic LUT memory and color determination signal transmission unit 601.

Figure 7B:
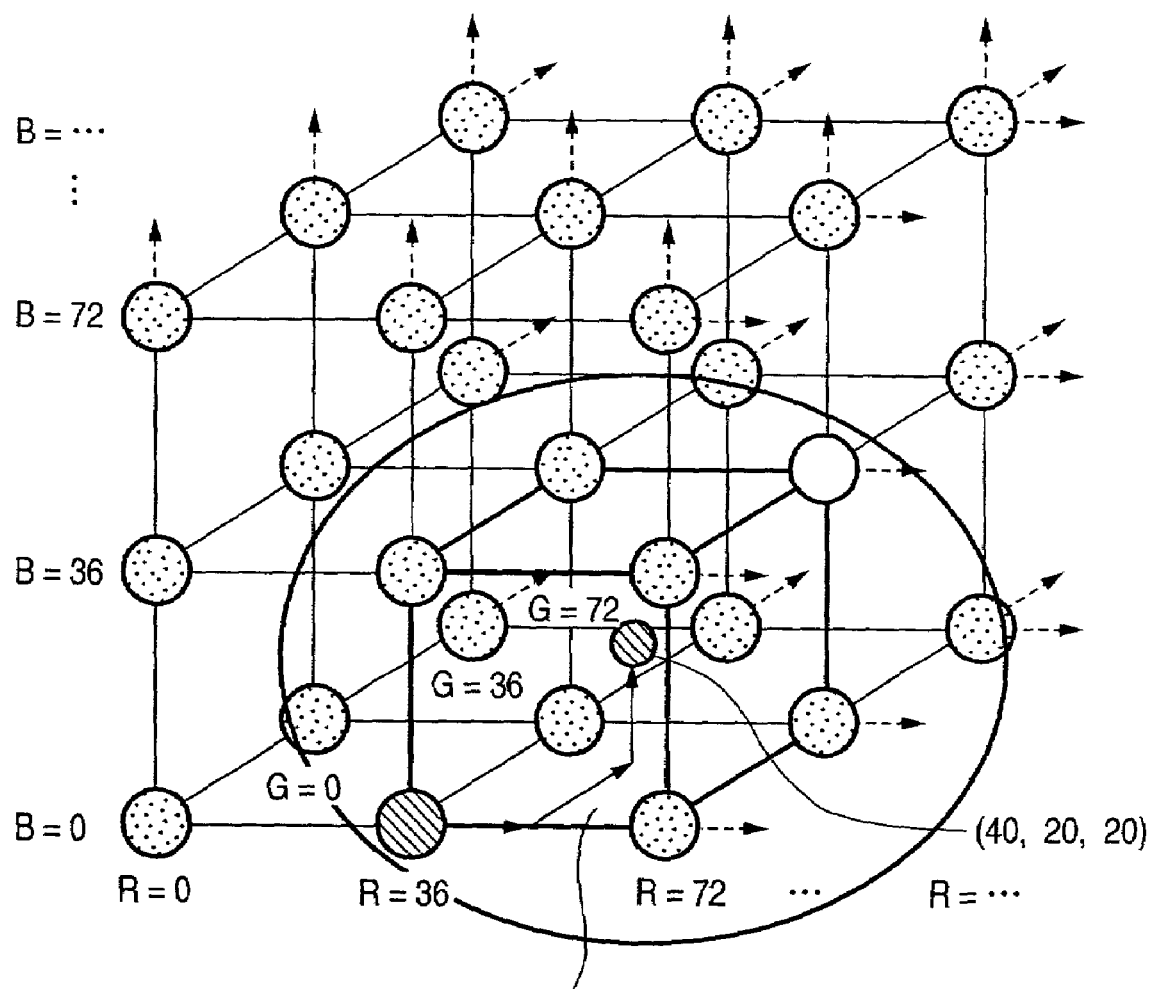
FIG. 7B shows an example of a color determination signal.

FIGS. 7A and 7B show the operations performed by the arithmetic LUT memory and color determination signal transmission unit 601. In FIG. 7A, reference numeral 701 denotes an example of the arithmetic LUT data stored in the LUT data storage device 404. In this case, since each color of RGB is divided into eight points, the LUT data is formed by $8^3 (=512)$ grating points. 702 and 703 respectively show the blocks of G=0 and G=36 in the arithmetic LUT data 701.

Figure 5:
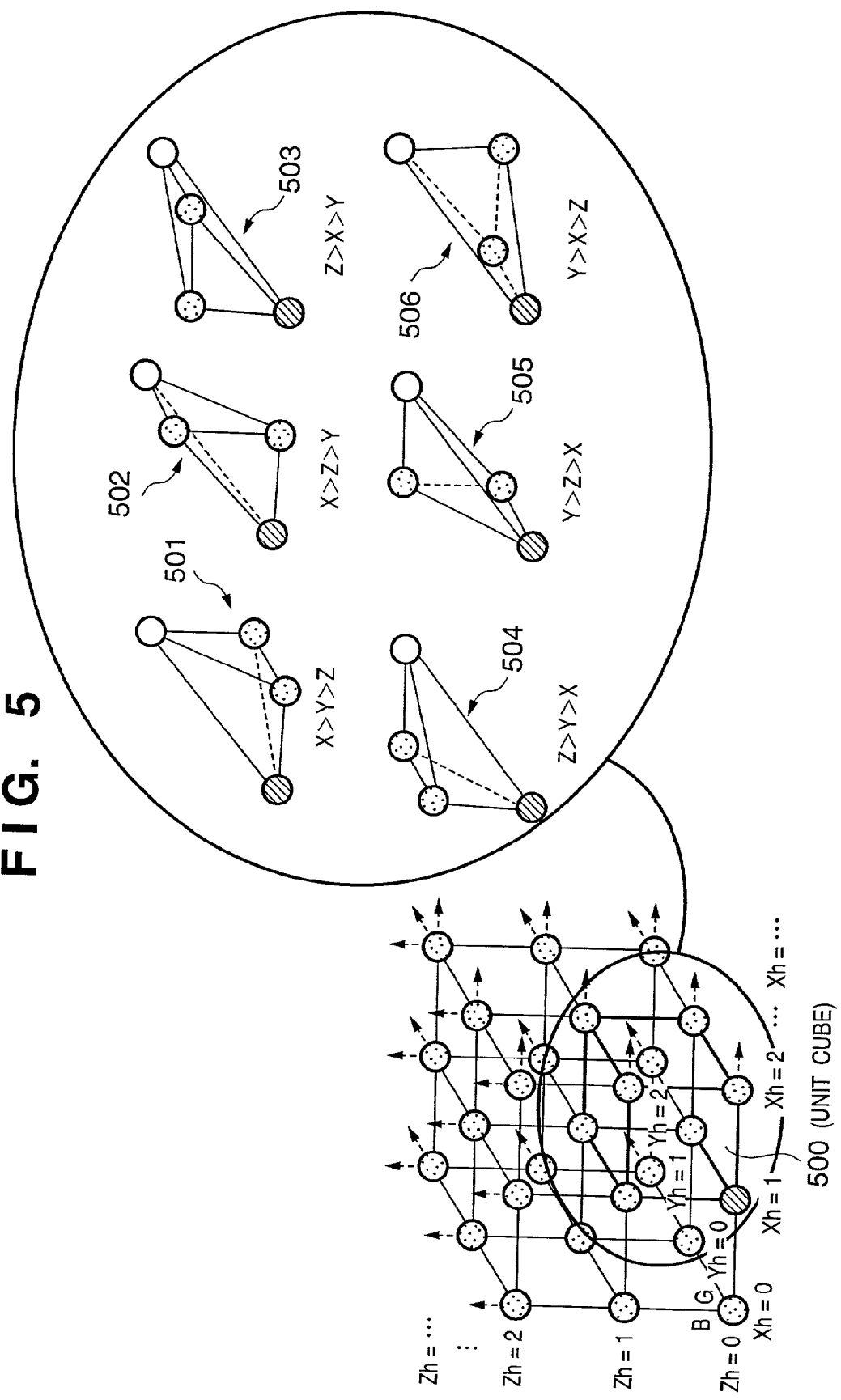
FIG. 5 shows an example of an interpolating method in the output signal correction unit 208.

In this case, since each color of RGB is divided into eight points, the unit cube 500 shown in FIG. 5 is formed by $7^3 (=343)$ in the RGB color space. Each unit cube 500 is assigned a number. For example, if an input image signal is R=40, G=20, and B=20, then it is addressed to the unit cube 500 assigned the unit cube number of 2 as shown in FIG. 7B.

In the arithmetic LUT memory and color determination signal transmission unit 601, the unit cube number of 2 corresponding to the pixel is output as a color determination signal to the spatial filter unit by color gamut 212.

[Spatial Filter Unit by Color Gamut 212]

Described below in detail is the spatial filter unit by color gamut 212 according to the present embodiment. To clarify the characteristic according to the present embodiment, the configuration of the conventional spatial filter unit 209 shown in FIG. 2A is described by referring to FIG. 8A.

Figure 8A:
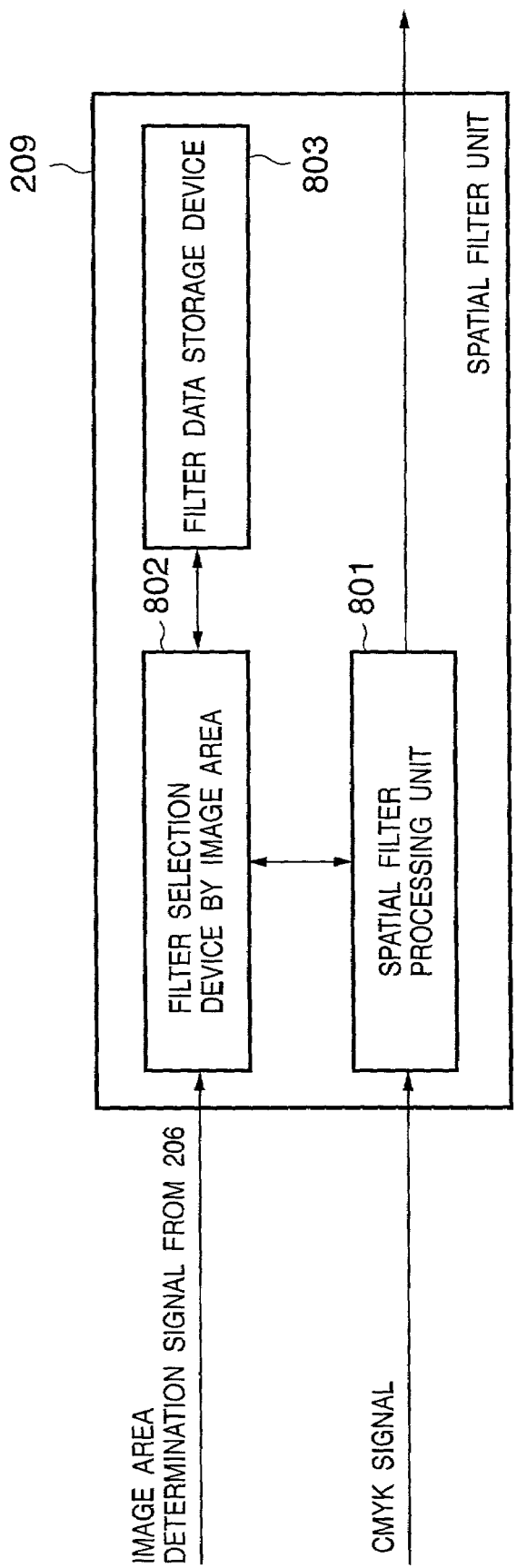
FIG. 8A is a block diagram of the detailed configuration of a spatial filter unit 209.

In FIG. 8A, reference numeral 801 denotes a spatial filter processing unit for performing a spatial filtering process, that is, an MTF correction, on the image signal transmitted from the output signal correction unit 208 at the previous stage. Reference numeral 802 denotes a filter selection device by image area for selecting spatial filter data corresponding to the determination signal based on the image area determination signal transmitted from the image area separation unit 206 from a filter data storage device 803, and provides the data to the spatial filter processing unit 801.

For example, a clear character with a sharp edge can be output by performing a filtering process having a spatial frequency characteristic as shown by 901 in FIG. 9 on the image data in the area of a character portion by the image area determination signal. On the other hand, a natural image smoothly reproduced in gray scale can be output by performing a filtering process having the spatial frequency characteristic as shown by 902 in FIG. 9 on the image data in the area of a natural image portion indicated by the image area determination signal.

Figure 8B:
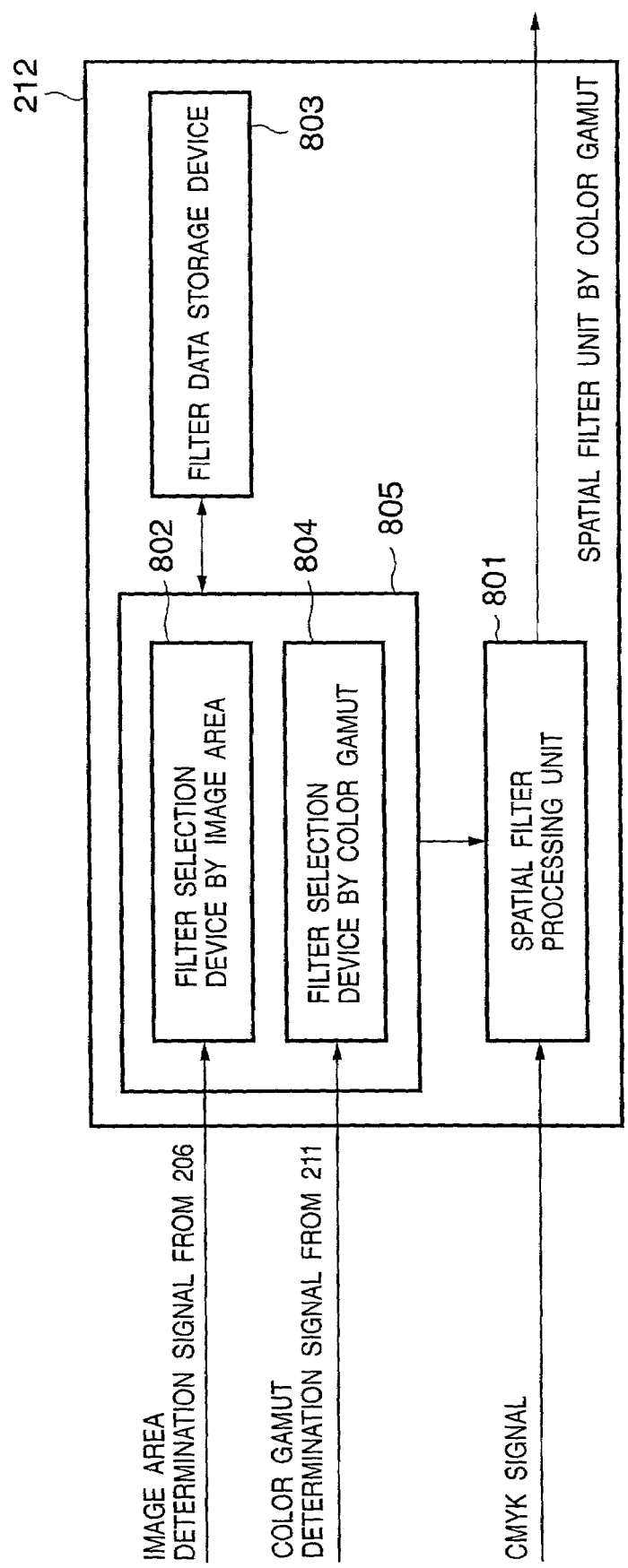
FIG. 8B is a block diagram of the detailed configuration of a spatial filter unit by color gamut 212.

FIG. 8B is a block diagram of the detailed configuration of the spatial filter unit by color gamut 212 according to the present embodiment. In FIG. 8B, the same configuration as in FIG. 8A is assigned the same number, and the detailed explanation is omitted here.

Reference numeral 804 denotes a filter selection device by color gamut for receiving a color determination signal from the output signal correction and color determination unit 211, that is, a unit cube number described above by referring to FIG. 7B, and selecting the corresponding spatial filter data from the filter data storage device 803.

Reference numeral 805 denotes a filter selection device formed by the filter selection device by image area 802 and the filter selection device by color gamut 804. It provides the filter data selected by the two selection devices from the filter data storage device 803 for the spatial filter processing unit 801. That is, by outputting the filter data selected by both filter selection device 802 by image area and filter selection device by color gamut 804, not only an image area of the input image data but also the filter data with the color gamut taken into account can be selected.

In the filter data storage device 803 shown in FIG. 8B, the filter data can be prepared for each color determination signal from the output signal correction and color determination unit 211, that is, for each unit cube number. However, as described above by referring to FIG. 7B, when each color of RGB is divided into 8 points, as much as 343 pieces of filter data are required. Therefore, it is not practical to store all of them. As a result, for example, it is effective to classify the entire unit cube into appropriate groups.

As an example, the arithmetic LUT data 701 shown in FIG. 7A is classified into approximately four groups, that is, the high gray scale group on the left, an intermediate gray scale group around the center, the low gray scale group on the right, and the group around the skin color. The filter data storage device 803 stores filter data corresponding to each group.

Thus, when it is divided into a plurality of gray scale groups, for example, a filtering process described below can be performed according to a color determination signal by the output signal correction and color determination unit 211 on the image data in an area recognized as a natural image portion by the image area separation unit 206. That is, if a filtering process having the characteristic shown by 902 in FIG. 9 is performed on the area recognized as a high gray scale group by the color determination signal, a filtering process a little weaker than the process performed on the high gray scale group and having the characteristic shown by 903 in FIG. 9 is performed on the area recognized as the intermediate gray scale group, and a filtering process further weaker than the process performed on the intermediate gray scale group and having the characteristic shown by 904 in FIG. 9 is performed on the area recognized as the low gray scale group. Then, the filtering process having the characteristic at a lower frequency as shown by 905 in FIG. 9 is performed on the skin color group.

It is obvious that a different filtering process is performed on each gray scale group of a character portion as on the natural image portion.

As described above, according to the present embodiment, a clearer image can be reproduced by performing a predetermined edge emphasizing process on the image data of the edge/character portion, and a predetermined smoothing process is performed on the image data of an even gray scale portion having less fluctuation is gray scale so that the image can appear smooth, etc. Thus, not only by switching the processes depending on the image area, but also by changing the level of the edge emphasizing process and the smoothing process depending on the type or pattern of the image data, the optimum MTF correction can be made depending on the type or pattern of image data.

That is, by performing the filtering process having a different spatial frequency characteristic for each gray scale group of input image data, the optimum MTF correction can be made with not only an image area but also the difference in color taken into account.

Furthermore, the image processing apparatus according to the present embodiment for realizing the above mentioned processes does not require a large configuration to be added to the configuration of the conventional image processing apparatus. Therefore, the present invention can be realized at a low cost.

In the output signal correction and color determination unit 211 according to the present embodiment, an RGB signal is input and a CMYK signal is output. However, the present invention is not limited to an intensity signal as input and a gray scale signal as output. For example, a signal in a Lab level color space can be input and a CMY signal can be output, the RGB signals are input and output, etc. Thus, a signal in an arbitrary format can be input and output.

Furthermore, according to the present embodiment, image processing parameters can be switched according to the image area determination signal and the color determination signal in the output signal correction process in the output signal correction and color determination unit 211, and the spatial filtering process in the spatial filter unit by color gamut 212. However, as in other image processing units such as a gray scale conversion unit, etc., the process parameters can be switched based on determination.

Additionally, the color determining process described above as performed by the image area separation unit 206 and the output signal correction and color determination unit 211 shown in FIG. 2B can also be performed by other processing units.

According to the present embodiment, the image area determination by the image area separation unit 206 is performed on a natural image portion and a character portion, but the image determination can also be performed on various areas such as a network point image area, a map area, etc.

Second Embodiment

In the first embodiment, an MTF correction is made to an image on each pixel based on a determination result by the image area separation means and the color gamut determination means. In the second embodiment, an image is divided into a plurality of image area blocks, and the MTF correction is made in block unit.

Figure 2C:
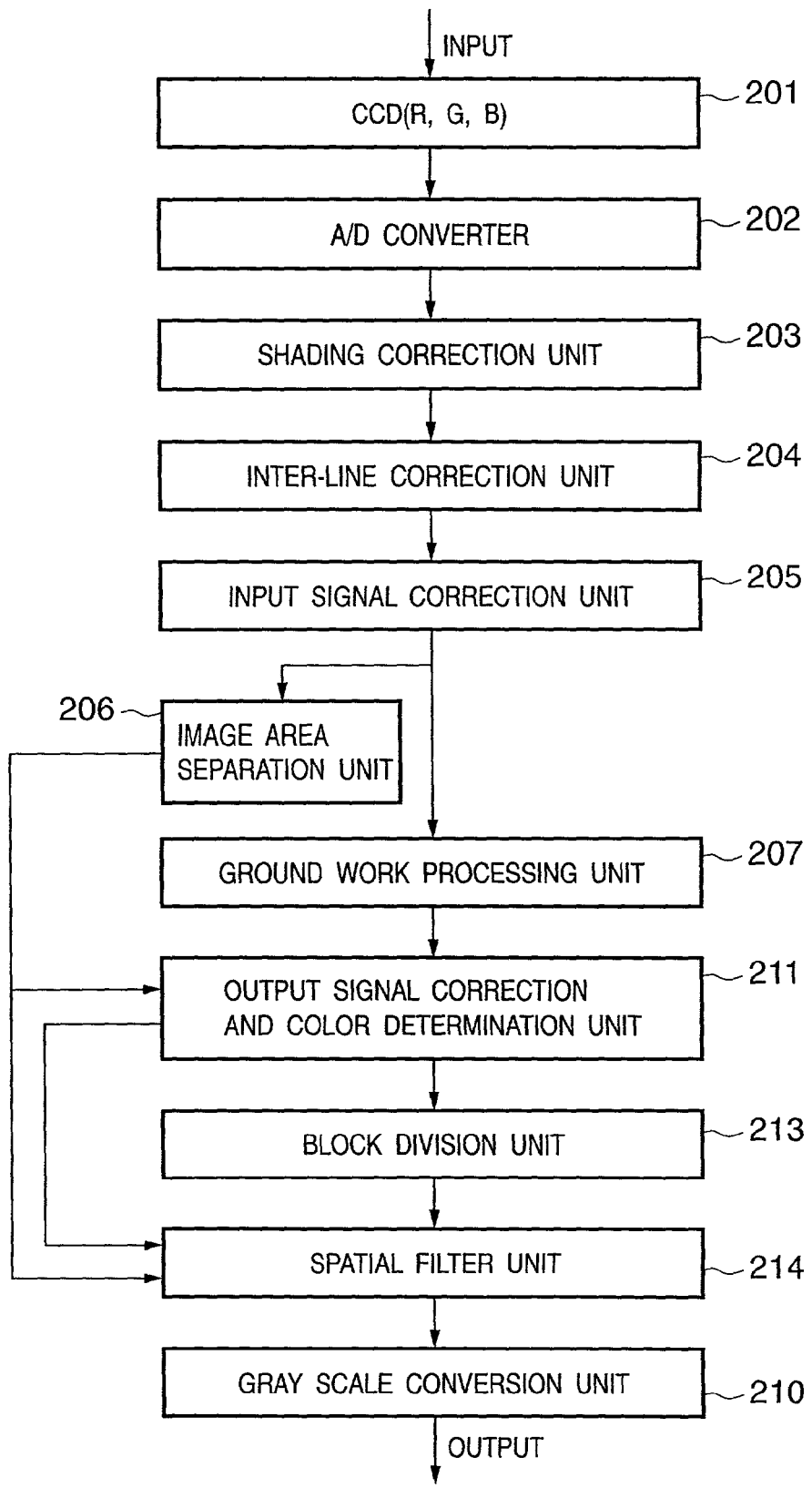
FIG. 2C shows the configuration of the image reader unit 101 according to the second embodiment.

FIG. 2C shows the configuration of the image reader unit 101 according to the second embodiment. In FIG. 2C, the same unit also shown in FIG. 2B according to the first embodiment is assigned the same reference numeral, and the detailed explanation is omitted here.

In FIG. 2C, the image data output from the output signal correction and color determination unit 211 is divided into tiles of M×N pixels by a block division unit 213 having a block line buffer. A spatial filter unit 214 determines the attribute of each tile according to the image area determination signal from the image area separation unit 206, and the color determination signal from the output signal correction and color determination unit 211.

In addition, although it is not described in detail, it is necessary to separately encode color information by a discrete cosine transform (JPEG), and perform a run length encoding process by encoding attribute flag data information when a color copying machine according to the second embodiment compresses an image. Therefore, it is desired that the above mentioned tile sizes of M and N are multiples of the window size for a discrete cosine transform encoding. For example, in the JPEG compression system, the window size for compression is 8×8 pixels. Therefore, if M=N=32, a tile of 32×32 pixels can be further divided into 16 groups of 8×8 pixels, thereby performing the JPEG compression in 8×8 pixels unit. Then, according to the second embodiment, the tile size is set to M=N=32. However, the present invention is not limited to the value.

In the spatial filter unit 214 for making the MTF correction according to the second embodiment, the spatial filtering process is performed on each tile of 32×32 pixels. At this time, the filter coefficient can be switched for each tile and set. A switch signal for control of the filter switching by the spatial filter unit 214 can be generated as attribute determination data according to the image area determination signal and the color determination signal.

The attribute determination data can be generated for each pixel. However, since the attribute of each pixel of a tile is constant according to the second embodiment, it is necessary to determine one attribute (tile attribute) representing the tile by analyzing the attribute determination data of each pixel of the tile. FIG. 10 shows the filter setting process depending on the tile attribute of an image. Reference numeral 1001 denotes an original image (1 page) containing both photograph areas and character areas. Reference numeral 1002 denotes attribute determination data for each pixel generated for the original image 1001. In this example, only character areas are extracted.

Reference numeral 1003 denotes a result of dividing the entire original image 1001 into tiles of M×N pixels (32×32 pixels in this example) (tile division image). In the second embodiment, a spatial filter can be set for each tile.

Reference numeral 1004 denotes an example of classifying the tile division image 1003 into a tile containing a character attribute and a tile not containing it by referring to the attribute determination data 1002 for each pixel. In FIG. 10, the hatched tile is identified as a tile not containing a character.

In a method of determining whether or not a tile contains a character, it is determined that a tile contains a character if a pixel in the 32×32 pixels tile contains a character attribute flag, or if the number of pixels of attribute flag data containing a character attribute is counted in the tile and the number excels a predetermined threshold.

If an image is classified as 1004, then the number of tiles containing characters and the number of tiles containing no characters are counted, and the respective ratios to the entire image are computed. In the example shown by 1004, the number of tiles containing characters is 42, that is, 32%, to the total number of 130. The rate of the tiles containing no characters is 68%.

In the spatial filter unit 214, the spatial filter applicable to the tile containing a character and the spatial filter applicable to the tile containing no character are selected depending on the respective rates to make an appropriate MTF correction to the image data. That is, depending on the input image data or on the ratio of the character area or picture area in the entire image, spatial filters are automatically switched each time an MTF correction is made. As a result, for example, the larger the ratio of the tiles containing characters is, the clearer image the MTF correction can make.

As described above, according to the second embodiment, an appropriate MTF correction can be made depending on the attribute in predetermined block unit of image. Furthermore, an MTF correction can be made depending on the ratio of a predetermined area to the entire image.

It is obvious that the timing of dividing into blocks according to the second embodiment is not limited to the point immediately before the spatial filter unit 214 (the block division unit 213).

Furthermore, according to the second embodiment, filters are switched by the spatial filter unit 214 depending on the block attribute of the image. However, the present invention is not limited to this example. That is, in other processing units, parameters can be switched depending on the block attribute.

Other Embodiment

The present invention can be applied to a system comprising a plurality of units (for example, a host computer, an interface appliance, a reader, a printer, etc.), and can be applied to a device comprising a single appliance (for example, a copying machine, a facsimile device, etc.).

It is obvious that the object of the present invention can also be attained by providing a storage medium (or a recording medium) storing a program code of software realizing the functions of the above mentioned embodiment for a system or a device, and by the computer (or CPU or MPU) of the system or the device reading and executing the program code stored in the storage medium. In this case, the program code read from the storage medium realizes the function of the above mentioned embodiment, and the storage medium storing the program code configures the present invention. Additionally, it is obvious that the functions of the above mentioned embodiment can also be realized not only by executing the program code read by the computer, but also by the operating system (OS), etc. operating in the computer at an instruction of the program code and performing a part or all of the actual process.

Furthermore, it is also obvious that the function of the above mentioned embodiment can be realized, after the program code read from the storage medium is written to a function extension card inserted into the computer or the memory in the function extending unit connected to the computer, by the CPU, etc. in the function extension card and the function extending unit executing a part or all of the actual process according to the instruction of the program code.

As many apparently widely different embodiments of the present invention can be made without departing from the spirit and scope thereof, it is to be understood that the invention is not limited to the specific embodiments thereof except as defined in the claims.

What is claimed is:

1. An image processing apparatus, comprising: image input means for inputting a color image signal;
   image area determination means for determining an area characteristic in the color image signal;
   conversion means for converting the color image signal input by said image input means into an output image signal by an interpolating operation using a table memory, wherein the table memory stores interpolation data in each address, and higher order bits of the color image signal are used to define an address of the table memory in which interpolation data is stored, and lower order bits of the color image signal are used in the interpolating operation;
   color gamut determination means for determining a color gamut characteristic in the output image signal based on the higher order bits of the color image signal;
   correction means for making an MTF correction to the output image signal based on determination results of said image area determination means and said color gamut determination means; and
   image output means for visualizing the output image signal to which the MTF correction is made.

2. The apparatus according to claim 1, wherein
   said correction means makes a different MTF correction to the output image signal for each image area and color gamut.

3. The apparatus according to claim 2, wherein
   said correction means performs a spatial filtering process having a different frequency characteristic for each image area and color gamut on the output image signal.

4. The apparatus according to claim 1, wherein
   said image area determination means classifies each pixel of the color image signal into any of a predetermined plurality of image areas depending on the area characteristic.

5. The apparatus according to claim 4, wherein said predetermined plurality of areas contain a natural image area.

6. The apparatus according to claim 4, wherein said predetermined plurality of areas contain a character image area.

7. The apparatus according to claim 4, wherein
   said predetermined plurality of areas contain any of a photograph image area, a network point image area, a black character area, and a color character area.

8. The apparatus according to claim 1, wherein
   said color gamut determination means classifies each pixel of the color image signal into a predetermined color gamut in a color space.

9. The apparatus according to claim 8, wherein
   said predetermined color gamut in the color space is an area indicated by a unit cube in the color space.

10. The apparatus according to claim 9, wherein
    said color gamut determination means assigns to each pixel of the color image signal an identification number of the unit cube into which the pixel is classified.

11. The apparatus according to claim 10, wherein
    said correction means classifies each pixel of the color image signal into a predetermined color group depending on a unit cube number assigned by said color gamut determination means, and performs a spatial filtering process depending on the color group.

12. The apparatus according to claim 11, wherein
    said color group contains a high gray scale group, an intermediate gray scale group, a low gray scale group, and a skin color group.

13. The apparatus according to claim 1, wherein said image input means inputs the color image signal by reading an original image.

14. The apparatus according to claim 1, wherein
    said image output means forms a visible image on a storage medium according to the color image signal to which the MTF correction is made.

15. The apparatus according to claim 1, wherein the information is higher order bits of a pixel data included in the color image signal.

16. An image processing apparatus, comprising:
    image input means for inputting a color image signal;
    image area determination means for determining an area characteristic in the color image signal;
    conversion means for converting the color image signal input by said image input means into an output image signal by an interpolating operation using a table memory, wherein the table memory stores interpolation data in each address, and higher order bits of the color image signal are used to define an address of the table memory in which interpolation data is stored, and a lower order bits of the color image signal are used in the interpolating operation;
    block division means for dividing the output image signal into blocks for each image area depending on a determination result by said image area determination means and based on the higher order bits of the color image signal;
    correction means for making an MTF correction to each block depending on a block ratio for each image area to an entire block of the output image signal; and
    image output means for visualizing the output image signal to which the MTF correction is made.

17. The apparatus according to claim 16, wherein
    said correction means makes a different MTF correction to the output image signal for each image area.

18. The apparatus according to claim 17, wherein said correction means performs a spatial filtering process having a different frequency characteristic for each image area on the output image signal.

19. The apparatus according to claim 16, wherein said block division means divides the output image signal into a block containing a character and a block containing no characters.

20. The apparatus according to claim 16, wherein the information is higher order bits of a pixel data included in the color image signal.

21. An image processing method, comprising:
an image inputting step of inputting a color image signal;
an image area determining step of determining an area characteristic in the color image signal;
a converting step of converting the color image signal input in said image input step into an output image signal by an interpolating operation using a table memory, wherein the table memory stores interpolation data in each address, and higher order bits of the color image signal are used to define an address of the table memory in which interpolation data is stored, and lower order bits of the color image signal are used in the interpolating operation;
a color gamut determining step of determining a color gamut characteristic in the output image signal based on the higher order bits of the color image signal;
a correcting step of making an MTF correction to the output image signal based on determination results of said image area determining step and said color gamut determining step; and
an image outputting step of visualizing the output image signal to which the MTF correction is made.

22. An image processing method, comprising:
an image inputting step of inputting a color image signal;
an image area determining step of determining an area characteristic in the color image signal;
a converting step of converting the color image signal input in said image input step into an output image signal by an interpolating operation using a table memory, wherein the table memory stores interpolation data in each address, and higher order bits of the color image signal are used to define an address of the table memory in which interpolation data is stored, and lower order bits of the color image signal are used in the interpolating operation;
a block dividing step of dividing the output image signal into blocks for each image area depending on a determination result in said image area determining step and based on the higher order bits of the color image signal;
a correcting step of making an MTF correction to each block depending on a block ratio for each image area to an entire block of the color image signal; and
an image outputting step of visualizing the output image signal to which the MTF correction is made.

23. A computer readable medium storing an image processing program executable by a computer, wherein said program comprises:
a code for an image inputting step of inputting a color image signal;
a code for an image area determining step of determining an area characteristic in the color image signal;
a code for a converting step of converting the color image signal input in said image input step into an output image signal by an interpolating operation using a table memory, wherein the table memory stores interpolation data in each address, and higher order bits of the color image signal are used to define an address of the table memory in which interpolation data is stored, and lower order bits of the color image signal are used in the interpolating operation;
a code for a color gamut determining step of determining a color gamut characteristic in the output image signal based on the higher order bits of the color image signal;
a code for a correcting step of making an MTF correction to the output image signal based on determination results of said image area determining step and said color gamut determining step; and
a code for an image outputting step of visualizing the output image signal to which the MTF correction is made.

24. A recording medium recording the program according to claim 23.

25. A computer readable medium storing an image processing program executable by a computer, wherein said program comprises:
a code for an image inputting step of inputting a color image signal;
a code for an image area determining step of determining an area characteristic in the color image signal;
a code for a converting step of converting the color image signal input in said image input step into an output image signal by an interpolating operation using a table memory, wherein the table memory stores interpolation data in each address, and higher order bits of the color image signal are used to define an address of the table memory in which interpolation data is stored, and lower order bits of the color image signal are used in the interpolating operation;
a code for a block dividing step of dividing the output image signal into blocks for each image area depending on a determination result in said image area determining step and based on the higher order bits of the color image signal;
a code for a correcting step of making an MTF correction to each block depending on a block ratio for each image area to an entire block of the output image signal; and
a code for an image outputting step of visualizing the output image signal to which the MTF correction is made.

26. A recording medium recording the program according to claim 25.

27. An image processing apparatus, comprising:
image input means for inputting a color image signal;
image area determination means for determining an area characteristic in the color image signal;
conversion means for converting the color image signal input by said image input means into an output image signal by an interpolating operation using a table memory, wherein the table memory stores interpolation data in each address, and higher order bits of the color image signal are used to define an address of the table memory in which interpolation data is stored, and lower order bits of the color image signal are used in the interpolating operation;
color gamut determination means for determining a color gamut characteristic in the output image signal based on the higher order bits of the color image signal;
correction means for making an image correction to the output image signal based on determination results of said image area determination means and said color gamut determination means; and
image output means for visualizing the output image signal to which the image correction is made.

28. An image processing method, comprising:
an image inputting step of inputting a color image signal;
an image area determining step of determining an area characteristic in the color image signal;

a converting step of converting the color image signal input in said image input step into an output image signal by an interpolating operation using a table memory, wherein the table memory stores interpolation data in each address, and higher order bits of the color image signal are used to define an address of the table memory in which interpolation data is stored, and lower order bits of the color image signal are used in the interpolating operation;

a color gamut determining step of determining a color gamut characteristic in the output image signal based on the higher order bits of the color image signal;

a correcting step of making an image correction to the output image signal based on determination results of said image area determining step and said color gamut determining step; and an image outputting step of visualizing the output image signal to which the image correction is made.

29. A computer readable medium for storing an image processing program executable by a computer, wherein said program comprises:

a code for an image inputting step of inputting a color image signal;

a code for an image area determining step of determining an area characteristic in the color image signal;

a code for a converting step of converting the color image signal input in said image input step into an output image signal by an interpolating operation using a table memory, wherein the table memory stores interpolation data in each address, and higher order bits of the color image signal are used to define an address of the table memory in which interpolation data is stored, and lower order bits of the color image signal are used in the interpolating operation;

a code for a color gamut determining step of determining a color gamut characteristic in the output image signal based on the higher order bits of the color image signal;

a code for a correcting step of making an image correction to the output image signal based on determination results of said image area determining step and said color gamut determining step; and a code for an image outputting step of visualizing the output image signal to which the image correction is made.

* * * * *

UNITED STATES PATENT AND TRADEMARK OFFICE
CERTIFICATE OF CORRECTION

| | | |
|---|---|---|
| PATENT NO. | : 7,054,032 B2 | Page 1 of 1 |
| APPLICATION NO. | : 09/945801 | |
| DATED | : May 30, 2006 | |
| INVENTOR(S) | : Shinichi Kato | |

It is certified that error appears in the above-identified patent and that said Letters Patent is hereby corrected as shown below:

COLUMN 1

Line 43, "blur," should read --blurry,--.

COLUMN 4

Line 64, "an" should read --a--.

COLUMN 12

Line 32, "rate" should read --ratio--.

COLUMN 14

Line 52, "a" should be deleted.

Signed and Sealed this

Twenty-seventh Day of March, 2007

JON W. DUDAS
*Director of the United States Patent and Trademark Office*